T. P. HORNE.
AERO PROPELLER EFFICIENCY INDICATOR.
APPLICATION FILED SEPT. 1, 1920.

1,389,830.

Patented Sept. 6, 1921.
2 SHEETS—SHEET 1.

Theodore P. Horne
Inventor

By *Lancaster and Allwine*
Attorneys

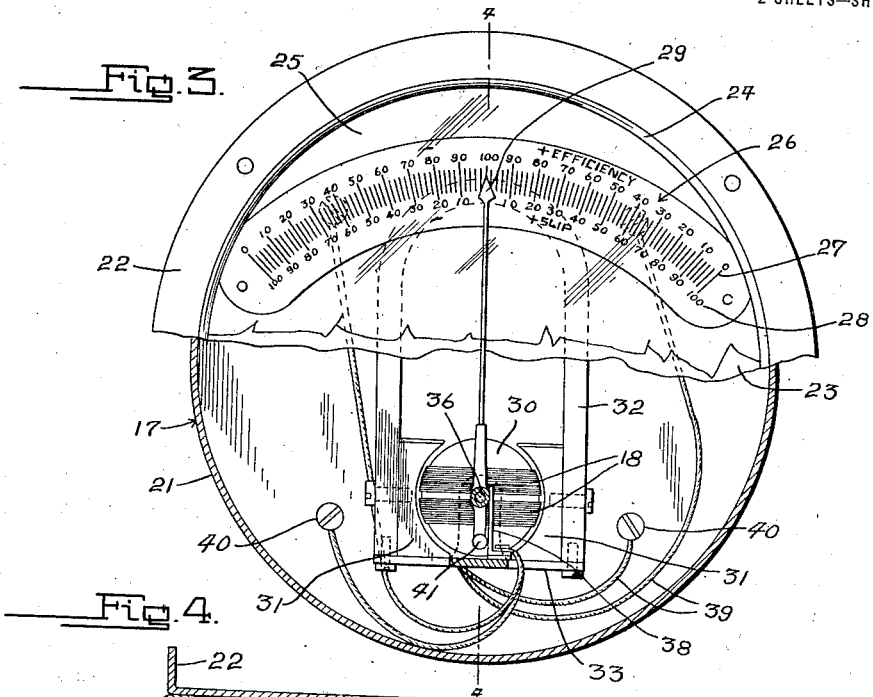
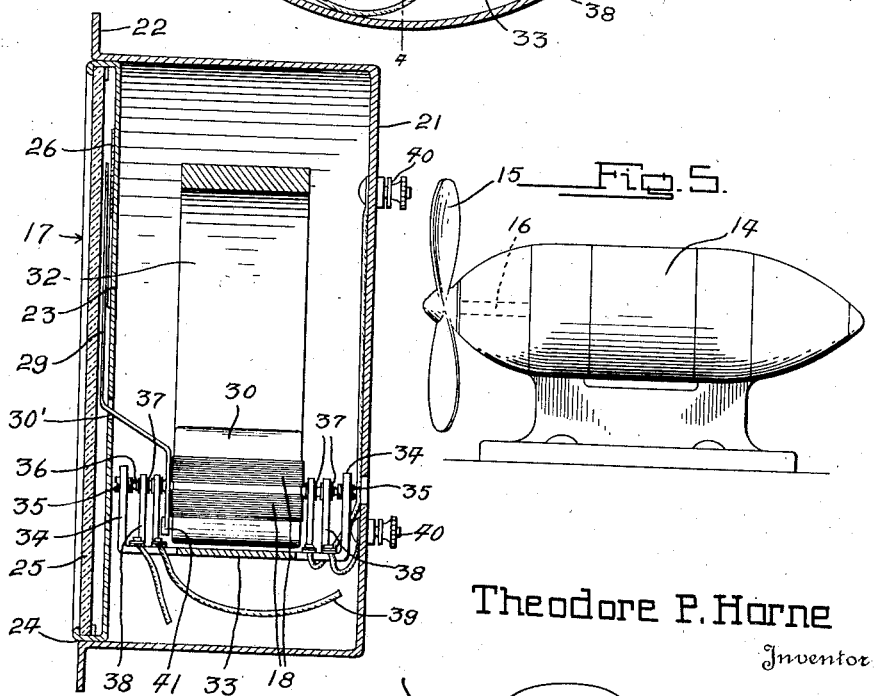

UNITED STATES PATENT OFFICE.

THEODORE P. HORNE, OF NEWPORT NEWS, VIRGINIA.

AERO-PROPELLER EFFICIENCY-INDICATOR.

1,389,830.  Specification of Letters Patent.  Patented Sept. 6, 1921.

Application filed September 1, 1920. Serial No. 407,494.

*To all whom it may concern:*

Be it known that I, THEODORE PHILIP HORNE, a citizen of the United States, residing at Newport News, in the county of Warwick and State of Virginia, have invented certain new and useful Improvements in Aero-Propeller Efficiency-Indicators, of which the following is a specification.

The present invention relates to an apparatus for use on airplanes or other airships, for testing the efficiency of the propeller and obtaining calculations as to the efficiency and slip of the propeller, in order that the most efficient propeller can be constructed or selected.

Another object is the provision of such an apparatus which will greatly aid in the development of the airplane, by testing and indicating the efficiency of the propeller used, and guiding the engineer or designer in the proper construction of the propeller to be used for the particular type of airplane.

A further object is the provision of such an apparatus including means operated with the airplane propeller and its engine, means operated by the relative motion and speed of the air and airship, and a differential indicator controlled by both of said means whereby to indicate the efficiency and slip of the propeller.

A still further object is the employment in such an apparatus, of electrical generators, one operated with the airplane propeller and its engine, and the other driven by a free propeller operated by the relative motion and speed of the air and airplane, with an electrical differential galvanometer controlled by both generators for indicating the efficiency due to the differences in electrical energy generated.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Fig. 3 is a front view of the differential galvanometer or indicator proper, portions being broken away.

Fig. 4 is a section on the line 4—4 of Fig. 3.

Fig. 5 is an elevation of the "free" electrical generator.

Figure 1:
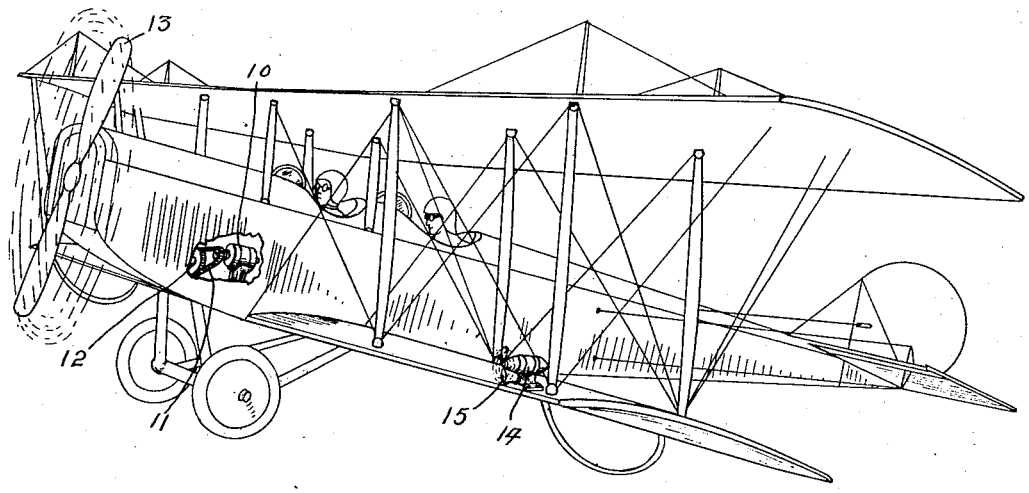
Figure 1 is a perspective view of an airplane, showing the two electrical generators installed thereon.

In carrying out the invention, two devices are employed, one of which is operated with the airplane propeller and the engine, and the other being free and operated by the relative motion and speed of the airplane and air. In the apparatus as shown, these devices constitute electrical generators, and one generator 10 is suitably mounted in or on the airplane, and is operatively connected, as at 11, with a shaft 12 of the engine which drives the propeller 13, whereby said generator 10 is operated with the propeller and engine at a speed proportional to the propeller speed. The second electrical generator 14 is also suitably mounted in or on the airplane, preferably on one wing thereof, as seen in Fig. 1, and its body or casing is of stream line form, so as to offer least resistance to the air, and a free propeller 15 is secured on the armature shaft 16 of the generator 14, whereby to be operated by the relative motion of the air and airplane, and at a speed proportional to the relative speed of the air and airplane. Thus, one generator is operated at a speed dependent on the speed of the propeller 13, while the other generator is free of the engine and is operated at a speed proportional to the relative speed of the air and airplane. Such generators can be of any suitable voltage and amperage.

Figure 2:
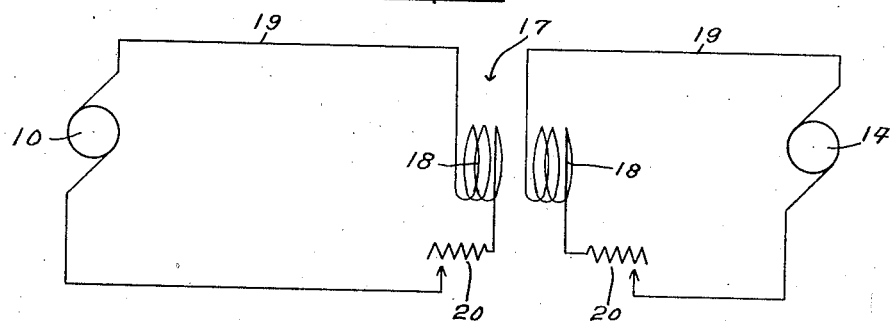
Fig. 2 is a diagrammatical view of the two electrical circuits.

A differential indicator is employed for indicating the difference between the operation of the two devices or generators operated with the propellers 13 and 15, and with the electrical generators, a differential galvanometer is used, and this galvanometer or indicating device 17 has the balanced armature coils 18 disposed in the electrical circuits 19 of the two generators 10 and 14, as seen in Fig. 2, and said coils 18 and generators are connected in series with variable resistance 20, for calibrating the electrical current of the two circuits to obtain a proper balance for neutral conditions.

The detail construction of the differential galvanometer is shown in Figs. 3 and 4, said galvanometer including a suitable case 21 having an outstanding annular flange 22 at its front edge, for attaching the galvanometer to an instrument board or other support, and a dial plate or disk 23 is fitted within the mouth of the case 21, being provided with a forwardly-extending marginal flange 24 fitting the rim of the case 21 and holding a glass or other transparent panel 25. The plate 23 carries an arcuate scale 26 containing graduations 27 reading from one hundred per cent. efficiency down to zero in opposite directions from an intermediate or neutral point, for indicating positive and minus efficiency at the opposite sides of such neutral point, and said scale has a complementary series of graduations 28 indicating the loss of efficiency or slip running from zero at the neutral point to one hundred per cent. in the opposite directions for indicating positive and minus slip, as seen in Fig. 3. A pointer or index 29 is movable along the graduations for simultaneously indicating either positive or minus efficiency and corresponding slip.

The pointer or index 29 is connected to the armature 30 of the galvanometer on which the coils 18 are wound, whereby said coils when equally energized, will result in an electrical balance of the galvanometer, with the pointer 29 at neutral position, as seen in Fig. 3. The pointer 29 is offset, to pass through a slot 30' in the plate 23, with the free end of the pointer between said plate 23 and panel 25, and the opposite end of the pointer connected to the armature 30 behind said plate 25. The armature 30 is rotatably mounted between the pole pieces 31 of a permanent horse-shoe magnet 32 mounted within the case 21 in rear of the plate 23, and a base 33 is secured to the lower ends of the magnet 32 and has posts 34 supporting bearings 35 for the ends of the armature shaft 36, whereby to support the armature from free turning movement with minimum friction.

Collector rings 37 are mounted on the armature shaft 36 to which terminals of the coils 18 are connected, and brushes 38 carried by the base 33 bear against said rings and are connected by wires 39 to binding posts 40 on the back of the case 21, for the connection of the other wires or conductors of the electrical circuits 19. The pointer 29 has a balancing weight 41 (or a spring can be used), whereby in the absence of electrical current flowing through the coils or windings 18, or the flow of equal current through said coils, the pointer 29 will remain at the neutral position, thereby mechanically and electrically balancing the armature.

In using the apparatus, with the airplane in flight, the generator 10 being driven at a speed proportional to the speed of the propeller 13, and the generator 14 being driven at a speed proportional to the relative speed of the air and airplane, due to the movement of the propeller 15, will energize the two coils 18 of the galvanometer accordingly, and if each propeller 13 is fully efficent, the electrical current generated by the generator 10 will balance the current generated by the generator 14, so that the pointer 29 will indicate one hundred per cent. efficiency and zero slip. The energization of the coils 18 will thus neutralize one another, showing the greatest efficiency for the particular engine speed at which the propeller 13 is running. Should the propeller 13 and generator 10 operate relatively faster than the generator 14 and propeller 13, the electrical current generated by the generator 10 will energize the corresponding coil 18 greater than the other, thereby swinging the pointer 29 to indicate positive efficiency (toward the right in Fig. 3) and the faster the generator 10 and propeller 13 rotate with respect to the generator 14, the less will become the positive efficiency and the greater will become positive slip, as the pointer 29 moves toward the right in Fig. 3. Should the propeller 13 and generator 10 move relatively slower than the generator 14 and propeller 15, the pointer 29 will move to the minus graduations, due to the fact that the electrical energy from the generator 14 will be stronger than that from the generator 10, whereby the unequal energization of the coils 18 will move the pointer 29 toward the left, as seen in Fig. 3. In this way, the galvanometer indicates, due to differences in electrical energy from the two sources, the positive or minus efficiency of the propeller for various speeds, and the corresponding slip. The proper form or type of propeller can thus be selected or designed to most efficiently serve the purpose, and to provide for economy in fuel by eliminating the loss in propeller efficiency due to resistance, friction, or the like. The apparatus is thus valuable to the airplane designer or engineer in testing propellers and selecting or designing the most efficient propeller for the particular type of airplane.

Having thus described the invention, what is claimed as new is:—

1. The combination in an airplane, of means operable with the propelling means of the airplane, other means operable proportional to the relative speed of the air and airplane, and a differential indicator controlled by the first named and last named means to indicate propeller efficiency.

2. The combination in an airplane, of means operable in proportion to the speed of the airplane propelling means, other means constructed and arranged to be operated by the relative motion and speed of the air and airplane, and means controlled by the first named and last named means for indicating differences in operation thereof and for determining the efficiency of said propelling means.

3. The combination in an airplane, of an electrical generator operated by the airplane propelling means, a second electrical generator having means to be operated by the relative motion and speed of the air and airplane, and means energized by said generators for indicating the difference in current generated and for determining the efficiency of said propelling means.

4. The combination in an airplane, of an electrical generator operable with the propelling means of the airplane, a second free generator having propelling means to operate same proportional to the relative speed between the air and airplane, and a differential galvanometer electrically connected to said generators and having means for indicating the efficiency of said propelling means.

5. The combination in an airplane, of an electrical generator connected to the propelling means of the airplane, a second free generator having a propeller to operate same according to the relative motion and speed of the air and airplane, and a differential galvanometer having balanced armature coils connected in circuit with the generators, and having an index and scale of graduations coöperable with the index and graduated to indicate the efficiency of said propelling means,

THEODORE P. HORNE.